United States Patent [19]

Siegers

[11] 4,369,114
[45] Jan. 18, 1983

[54] ADSORPTION PROCESS WITH RESIN TRANSFER

[75] Inventor: Günter Siegers, Bergish-Gladbach, Fed. Rep. of Germany

[73] Assignee: Bayer Aktiengesellschaft, Leverkusen, Fed. Rep. of Germany

[21] Appl. No.: 267,234

[22] Filed: May 26, 1981

Related U.S. Application Data

[63] Continuation of Ser. No. 198,745, Oct. 20, 1980, abandoned.

[30] Foreign Application Priority Data

Dec. 18, 1979 [DE] Fed. Rep. of Germany ....... 2950875

[51] Int. Cl.³ ...................... B01D 15/02; B01D 23/24
[52] U.S. Cl. .................................... 210/661; 210/675; 210/678
[58] Field of Search ............... 210/661, 670, 675, 676, 210/678, 264, 275, 277, 278, 283, 284

[56] References Cited

U.S. PATENT DOCUMENTS

| 2,632,720 | 3/1953 | Perry | 210/661 |
|---|---|---|---|
| 2,801,966 | 8/1957 | Mertes | 210/675 |
| 2,855,364 | 10/1958 | Roberts | 210/678 |
| 3,458,436 | 7/1969 | Martinola | 210/678 |
| 3,813,333 | 5/1974 | Plura | 210/676 |
| 3,846,298 | 11/1974 | Plura | 210/676 |
| 3,960,721 | 6/1976 | Heskett | 210/678 |
| 4,233,158 | 11/1980 | Wachsmuth | 210/283 |
| 4,238,325 | 12/1980 | Heskett | 210/678 |

FOREIGN PATENT DOCUMENTS 1442689 10/1971 Fed. Rep. of Germany .

Primary Examiner—Ernest G. Therkorn
Attorney, Agent, or Firm—Sprung, Horn, Kramer & Woods

[57] ABSTRACT

Countercurrent process for the treatment of liquids with adsorbents in a adsorption-filter the space of which is divided by trays which are permeable to liquids into at least 2 chambers, in which process before and/or during the charging of the adsorbent in the upward flow, the regeneration of the charged adsorbent in the downward flow and the backwasting in the upward flow particular levels to which the industrial chambers are filled are established by transferring adsorbent from one chamber to the adjacent chamber.

2 Claims, 5 Drawing Figures

ADSORPTION PROCESS WITH RESIN TRANSFER

This is a continuation of application Ser. No. 198,745, filed Oct. 20, 1980 now abandoned.

Countercurrent processes are already known for the treatment of liquids with adsorbents, in which the liquid to be treated is passed in upward flow through the adsorbent, it being ensured, by adjusting the flow rate in the filter, that the lower part of the adsorbent mass is in the form of a fluidised bed and the upper part is in the form of a fixed bed, regeneration of the charged adsorbent is effected in downward flow and backwashing of the adsorbent mass is effected in upward flow. Such a process is described, for example, in German Pat. No. 1,442,689. However, this efficient and economic process presents difficulties in the start-up phase after regeneration and washing out or after interruptions in operation. In this phase, there is the danger of rearrangement in the upper layer (fine purification layer), through which the liquid to be treated passes last. As a result of the rearrangement, the quality of the liquid treated is reduced and the capacity of the ion exchangers is not completely utilised.

Attempts have hitherto been made to avoid this rearrangement in the start-up phase by keeping the free space between the ion exchanger packing and the nozzle tray closing off the top of the ion exchanger chamber as small as possible. As a result of the changes in volume which the ion exchangers undergo during charging and regeneration, this free space does not, however, remain constant but changes continuously during the individual phases of operation. Thus, the highly dissociated ion exchangers shrink so greatly during charging that towards the end of the filter run, the free space, which is initially only about 10% by volume, relative to the ion exchanger volume, has grown to about 20% by volume. The free space is about 15% even after 50% of the running time, and rearrangement during interruptions in operation can only be avoided if the sinking of the ion exchanger on to the lower nozzle tray is accelerated by passing in, in the opposite direction to the operating direction, liquid which has already been treated. In practice, the problem is eased in the case of interruptions in the operation of discontinuously functioning ion exchanger units by changing the filter over to circulatory operation, that is to say, after shut-down the liquid present inside of the unit is circulated at a sufficient rate with the aid of a pump and the ion exchanger is in this manner fixed on the upper nozzle tray, as during operation. Carrying out this circulatory operation requires the installation of additional pipelines and valves, in addition to a pump and electrical driving energy.

Furthermore, the requirement for a free space which is as small as possible runs counter to the requirement for a sufficient backwashing space. Since backwashing in the filter was not possible as a result of the free space being to small, backwashing was carried out in a separate washing tank.

It has now been found that the abovementioned difficulties, that is to say avoiding rearrangement in the fine purification layer and providing a sufficient backwashing space within the filter, can be eliminated by dividing the filter space into at least 2 chambers separated by trays which are permeable to liquid, connecting these adjacent chambers to one another by devices which permit transfer of adsorbents, and establishing particular levels to which the individual chambers are filled, before and/or during the individual phases of operation, by transferring adsorbent from one chamber to the other chamber via the devices which permit transfer of adsorbent.

The invention thus relates to a countercurrent process for the treatment of liquids with adsorbents by charging the adsorbent in upward flow, the lower part of the adsorbent mass being in the form of a fluidised bed and the upper part being in the form of a fixed bed, regenerating the charged adsorbents in downward flow and backwashing in upward flow, which is characterised in that the filter space is divided into at least 2, preferably 2 or 3, chambers separated by trays which are permeable to liquid, these chambers are connected to one another by devices which permit transfer of adsorbent, the adsorbent is distributed between the chambers and particular levels to which the individual chambers are filled are established, before and/or during the individual phases of operation, by transferring adsorbent from one chamber to the other chamber by means of liquid to be treated, regenerating agent or backwashing liquid, via the devices which permit transfer of adsorbent.

The adsorbent is conveyed into the individual chambers, or removed from them, within the filter during the individual phases of operation, via the devices which permit transfer of the adsorbents, in an amount such that during charging, the chamber through which the liquid to be treated flows last is filled to the extent of 80 to 98% by volume, relative to the volume of adsorbent in the chamber, with adsorbent in the form of a fixed bed, and that during regeneration, this chamber through which the liquid flowed last is uniformly filled to the extent of 80 to 100% by volume, relative to the volume of adsorbent in the chamber, with adsorbent. That is to say, on regeneration of the ion exchanger, which swells during this process, a volume of adsorbent corresponding to the increase in volume of the ion exchanger in transferred from the chamber through which the liquid flowed last into the chamber located before the said chamber. During backwashing, adsorbent is transferred from the chamber to be backwashed into the adjacent chamber in an amount such that the backwashing space in the chamber to be backwashed is 30 to 100% by volume, preferably 40 to 50% by volume, relative to the volume of adsorbent in the chamber to be backwashed.

For transfer of adsorbent from one chamber to the other, the liquid to be treated is used during charging, the regenerating agent is used during regeneration and the backwashing liquid is used during backwashing.

The amount of adsorbent for packing the adsorption filter is advantageously chosen such that the volume of adsorbent is 55 to 85% by volume, preferably 60 to 80% by volume, of the filter volume.

Suitable adsorbents for the process according to the invention are, above all, ion exchangers, preferably those ion exchangers with volumes which decrease during charging and increase during regeneration, that is to say strongly acid cation exchangers or strongly basic anion exchangers. Ion exchangers of a uniform type, that is to say ion exchangers of a uniform acid strength or base strength, are used for packing the filter according to the invention.

In the context of the filters according to the invention, by trays which are permeable to liquid there are to be understood plates which are provided with openings (nozzles) and are known in ion exchanger filter technology, and which are permeable to the liquid but not to the adsorbent.

The disclosure furthermore relates to a device for carrying out the process. The device is characterised in that it consists of an adsorption filter which is divided into at least 2, preferably 2 or 3, chambers separated by trays which are permeable to liquid, and in which the chambers, which are arranged one on top of the other, are connected to one another by devices which permit transfer of adsorbent.

The ratio of the volumes of the chambers is 0.5–1.5:1, preferably 1:1, in the case where the filter is divided into 2 chambers and 0.5–1.5:0.5–1.5:1, preferably 1:1:1, in the case of division into 3 chambers.

Examples of possible devices which connect adjacent chambers and permit transfer of adsorbent are flaps or cocks incorporated in the trays which are permeable to liquid. Pipelines which are provided with a shut-off organ and which bridge the trays which are permeable to liquid have proved particularly suitable.

Such pipelines which bridge the trays which are permeable to liquid are advantageously located in the upper quarter of the lower chamber and in the lower quarter of the upper chamber, preferably in the upper fifth of the lower chamber and in the lower fifth of the upper chamber.

To achieve uniform transfer of adsorbent through the pipelines bridging the trays which are permeable to liquid, it has proved advantageous for the free cross-section of the openings in the trays which are permeable to liquid to be 50 to 300 cm$^2$/m$^2$ of the tray area, preferably 100 to 200 cm$^2$/m$^2$ of the tray area.

The process according to the invention can be carried out, for example, in the following manner:

In the charging phase, the pipeline leading to the chamber through which the liquid to be treated flows through last is opened. The adsorbent is continuously topped up through the line from the chamber below, according to the shrinkage of the ion exchanger, and in this way an optimum packing density is achieved. The filter run can be interrupted at any time without rearrangement with the disadvantages described occurring. Conversely, in the regeneration phase, an amount of resin corresponding to the swelling of the ion exchanger which occurs during regeneration is transferred, with the regenerating agent, which flows from top to bottom from the chamber through which the liquid to be treated flows last and the regenerating agent flows first, into the chamber located before this chamber. The result of this measure is that the ion exchanger contained in the chamber through which the regenerating agent flows first has sufficient space to assume its greatest volume during regeneration and in the washing-out phase. If backwashing of the adsorbent is to be carried out in the individual chambers, ion exchanger is transferred, with the aid of the backwashing liquid (water), into the chamber upstream or downstream in an amount such as is necessary to provide a backwashing space of suitable size.

Figure 1:
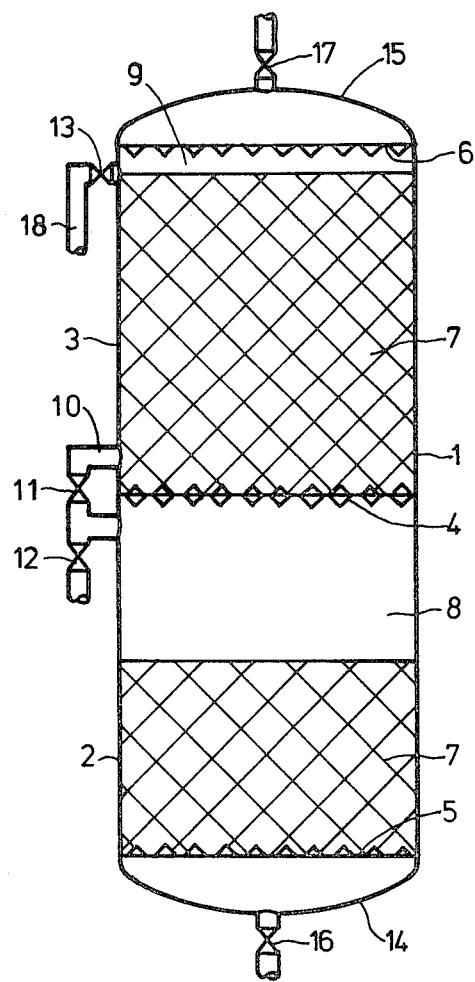
FIG. 1 shows a cross-section of the ion exchange filter device.

A preferred embodiment of the process according to the invention may be described with the aid of FIG. 1:

The ion exchanger filter 1 consists of two chambers 2 and 3 which are separated from one another by a nozzle tray 4 which is permeable to the liquid. Two further nozzle trays 5 and 6 close off the lower chamber at the bottom and the upper chamber at the top to the ion exchanger. The seals of the filter unit are formed by the dished boiler end 14 with valve 16 at the bottom and by the dished boiler end 15 with valve 17 at the top.

The two chambers 2 and 3 are filled with ion exchanger 7 of a uniform type. During operation, backwashing spaces 8 and 9 of different size remain above the ion exchanger packings. The two chambers 2 and 3 are connected to one another by the pipeline 10 via valve 11. The pipeline 10 is also provided with a valve 12 for the washing water to leave the lower chamber 2. The pipeline 18 and valve 13 enable the washing water to leave the upper chamber 3.

In the charging phase, the liquid to be treated is introduced via valve 16, which is opened, into the lower chamber 2, which is partly filled with ion exchanger 7. From there, the liquid flows through the nozzle tray 4, the opened connecting line 10, which serves to transfer the ion exchanger 7, and the opened valve 11 into the upper chamber 3, in order to leave the filter again, in the treated state, via the top nozzle tray 6 and valve 17. During this phase, ion exchanger 7 in the lower chamber 2 is continuously transferred to the upper chamber 3 in an amount corresponding to the shrinkage in volume of the ion exchanger 7, which shrinks progressively during charging, in the upper chamber 3. The effect of this is that the upper chamber 3 is always substantially filled with ion exchanger 7, and in the case of a discontinuous procedure, undesired rearrangement of the ion exchanger 7 in the upper chamber 3 is prevented during interruptions in operation. In the case of continuous operation, valve 11 in the connecting line 10 can remain closed, if the upper chamber 3 is already filled with ion exchanger 7 to the extent of at least 95% by volume at the start of the filter run, since in this case possible rearrangement can only be slight and in the case of a continuous procedure, interruptions in operation only occur before complete regeneration, and in this regeneration, the consequences of rearrangement which may occur are in any case compensated.

In the regeneration following charging, ion exchanger packing 7 is passed back, with the flow of regenerating agent passed from the top downwards, from the upper chamber 3 into the chamber 2, connected upstream thereof, in an amount corresponding to the increase in volume of the ion exchanger packing during regeneration, so that the ion exchanger in chamber 3 has sufficient space to assume its largest volume in the regeneration and washing-out phase.

If the packing of chamber 2 through which the medium to be treated flows first is to be backwashed, as much ion exchanger as possible is first transferred to chamber 3, which is downstream during operation, via line 10 and the opened valve 11. For this, the water for transferring the ion exchanger is allowed in at valve 16 and out at valve 17. Valves 16, 17 and 11 are then closed. When the ion exchanger 7 from chamber 2 to be backwashed has sunk into the region below the pipe 10, the backwashing operation can begin. For this, backwashing water enters at valve 16 and leaves at valve 12.

Backwashing of the ion exchanger 7 in chamber 3, through which the medium to be treated flows last, is effected by a procedure in which ion exchanger 7 is initially passed into chamber 2, which is upstream during operation, via the pipeline 10 and the opened valve 11, in an amount necessary to provide a backwashing space 9 of appropriate size. For this, valves 17, 11 and 16 are opened. Valve 11 is closed for the actual backwashing. Valves 16 and 13 remain open. The backwashing water enters at valve 16 and leaves at valve 13.

Compared with the known countercurrent process, the process according to the invention has the following advantages:

The changes in volume of the ion exchangers as the form of charging changes are compensated within the filter. An improved reliability in operation and a higher capacity between two regenerations are provided, and the quality of the liquid treated is also improved. It is possible to interrupt operation at any time. The additional pipelines, fittings, pumps and the like hitherto required for bridging such interruptions in operation are dispensed with. It is furthermore possible to carry out backwashing of the adsorbent in the filter itself. The need for a separate washing tank and the disadvantages associated with this need are thereby eliminated.

EXAMPLE 1

An ion exchanger filter constructed according to FIG. 1 is used. Its internal diameter is 290 mm and its cylindrical jacket height is 2,400 mm. The filter is filled with a total of 103 l of a strongly acid cation exchanger such that the height of the resin bed in the upper chamber through which the liquid to be pretreated flows last during charging is 1,080 mm and the height of the resin bed in the chamber upstream thereof is 480 mm.

The pipeline 10 connecting the two chambers has a nominal width of 40 mm (NW 40) and is mounted 600 mm (measured from the middle of the pipe) above and 200 mm (measured from the middle of the pipe) below the nozzle tray separating the two chambers.

To compare the capacities of the countercurrent process according to the invention and of the known countercurrent process, the ion exchanger filter described above is (a) operated in the manner according to the invention, that is to say the shrinkage of the ion exchanger in the upper chamber is compensated by introducing cation exchanger from the lower chamber (through the opened valve 11), and in this manner a uniform packing density is maintained in the upper chamber. (b) If the filter is operated in the known manner, that is to say a free space of 5% of the volume of resin in the chamber is established between the resin packing and the top nozzle tray in the upper chamber at the start of the filter run and the amount of cation exchanger in the chamber is kept constant by closing valve 11.

Crude water with a total salt content of 12 m equivalents/liter of water is used for the charging phase; the water is passed through the filter at a rate of 2,100 l/hour. After each throughput of 2 m$^3$, that is to say after 2, 4, 6, 8 (and 10) m$^3$ have passed through, the filter run is interrupted, in each case for 15 minutes, and the filter run is in each case ended when the conductivity in the runnings of the filter which is downstream of the cation exchanger and contains a strongly basic anion exchanger in the OH form has risen to 10 μS/cm.

Figure 2:
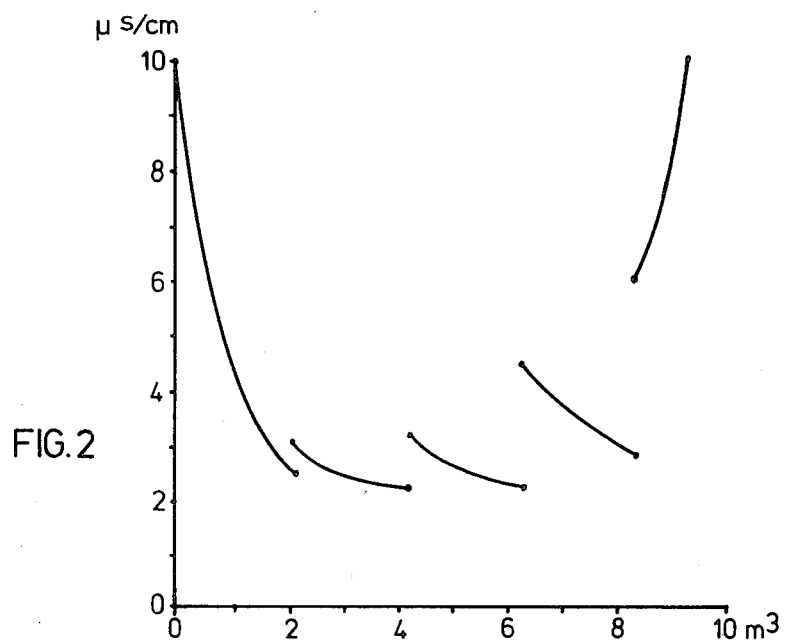
FIG. 2 plots conductivity against throughput for a prior art process.
Figure 3:
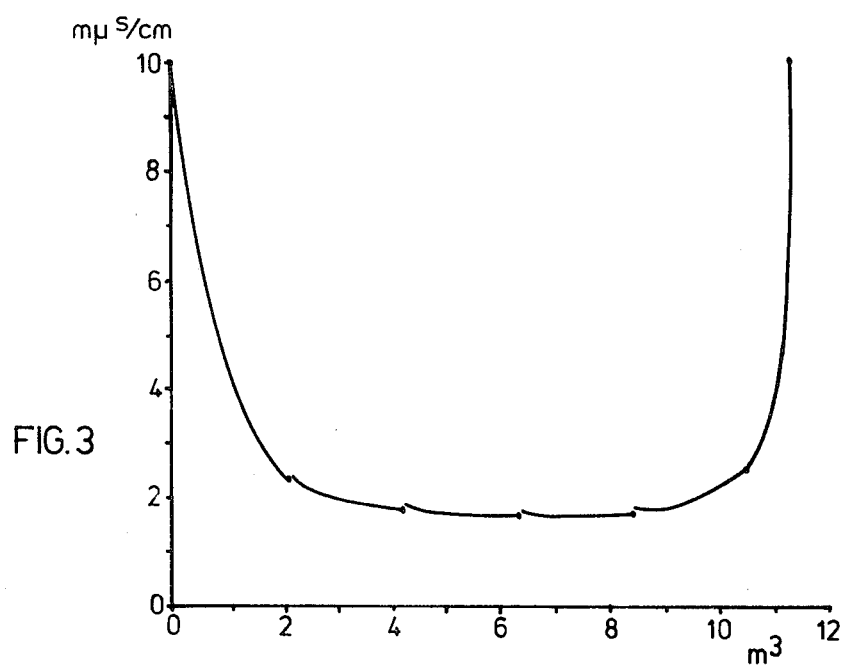
FIG. 3 plots conductivity against throughput for the process of the invention.

In FIGS. 2 and 3, the conductivity (in μS/cm) of the treated water is plotted against the throughput (in m$^3$). As can be seen from FIGS. 2 and 3, the process according to the invention (FIG. 3) gives a pure water of very uniform quality which is not affected by the interruptions in operation. In contrast, the known process (FIG. 2) gives a pure water quality which varies and continually worsens from interruption to interruption.

The process according to the invention and the known process also exhibit considerable differences in the throughputs per filter run and in the useful capacities achieved for the cation exchanger employed. The throughputs per filter run are: 11,248 l in the process according to the invention and 9,356 l in the known process.

The useful capacities achieved are: 1.31 equivalents/l for the process according to the invention and 1.09 equivalents/l for the known process.

Since the ion exchanger used in both processes has been regenerated with the same amount of regenerating agent, it follows that the utilisation of the regenerating agent is significantly better in the process according to the invention. The following regenerating agent excesses are calculated: 115% of theory for the process according to the invention and 139% of theory for the known process.

EXAMPLE 2

An ion exchanger filter constructed according to FIG. 1 is used. The filter has an internal diameter of 290 mm and a cylindrical jacket height of 2,400 mm. The filter is filled with a total of 105 l of a strongly basic anion exchanger in a manner such that the height of the resin bed in the upper chamber, through which the liquid to be treated flows last during charging, is 1,100 mm and the height of the resin bed in the chamber upstream thereof is 488 mm. Consequently, of the available filter volume, 66.17% by volume is occupied by the ion exchanger and the backwashing space which remains in 33.83% by volume.

The pipeline 10 connecting the two chambers has a nominal width of 40 mm (NW 40) and is connected in each case 100 mm (measured from the middle of the pipe) below and above the nozzle tray separating the two chambers.

To compare the capacities of the countercurrent process according to the invention and of the known countercurrent process, the ion exchanger filter described above is (a) operated in the manner according to the invention, that is to say the shrinkage of the anion exchanger in the upper chamber is compensated by introducing anion exchanger from the lower chamber (through the opened valve 11), and in this way a uniform packing density is maintained in the upper chamber. (b) Operated in the known manner, that is to say a free space of 5% of the volume of resin in the chamber is established between the resin packing and the top nozzle tray in the upper chamber at the start of the filter run and the amount of ion exchanger in the chamber is kept constant by closing valve 11.

Crude water which has been pretreated over a cation exchanger in the H form and has then been freed from most of the dissolved carbonic acid by bubbling in air is used for the charging. The content of chloride ions and sulphate ions is 5.7 to 5.8 m equivalents/l and the content of SiO$_2$ and CO$_2$ is 0.3 equivalents/l. The water is passed through the filter at a rate of 2,000 l/hour. After each throughput of 2 m$^3$, that is to say after 2, 4, 6, 8, 10 (and 12) m$^3$ have passed through, the filter run is interrupted for in each case 15 minutes. The filter run is ended when the silica value in the treated water has risen to 0.20 mg/l.

Figure 4:
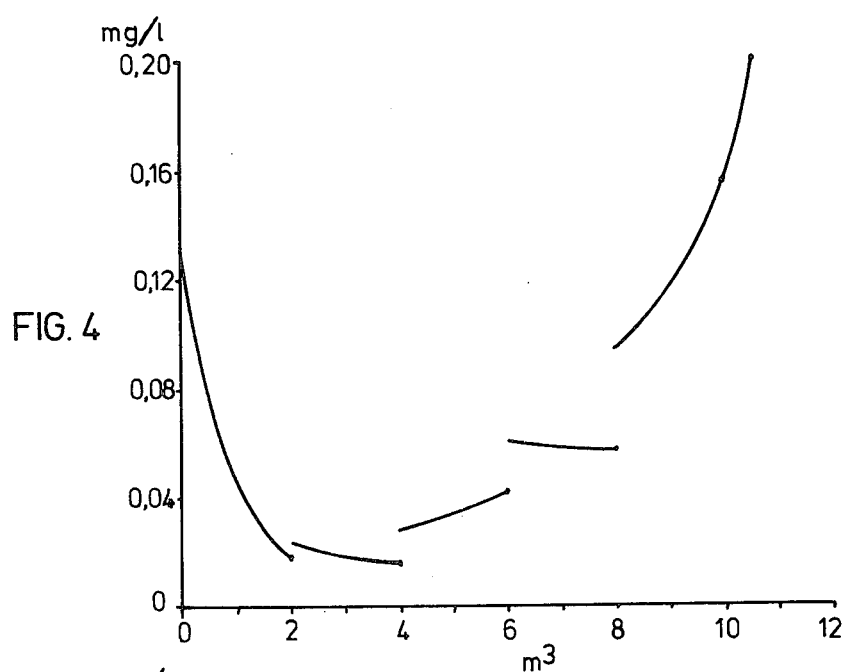
Figure 5:
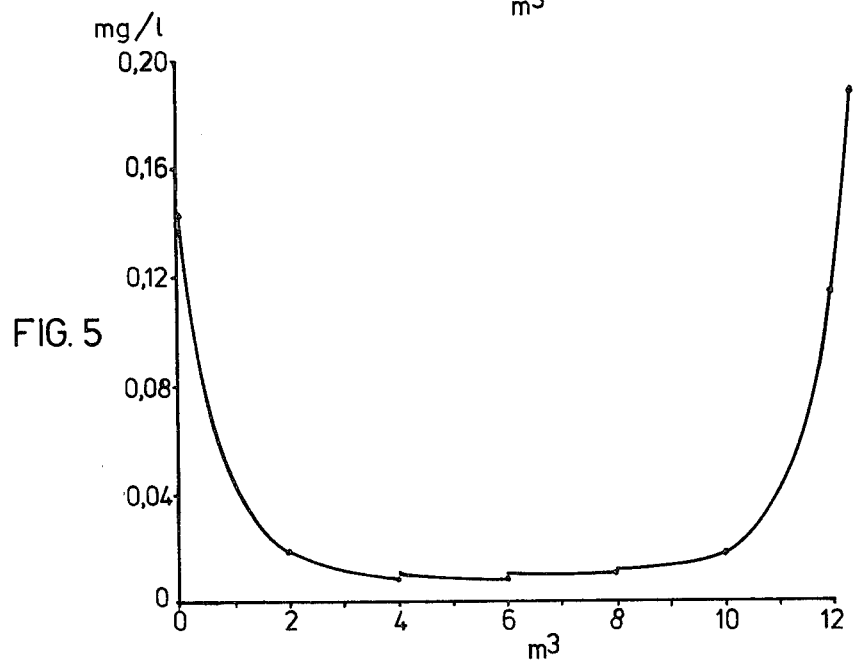

In FIGS. 4 and 5, the silica content of the treated water (mg/l) is plotted as a function of the throughput (in m³). As can be seen from FIGS. 4 and 5, the process according to the invention (FIG. 5) gives a pure water of very uniform quality which is independent of the interruptions in operation. The treated water is distinguished by low and constant residual silica values. In contrast, the known process (FIG. 4) gives pure water with low residual silica values only at the start of the filter run. The shrinkage, which increases as the charging of the anion exchanger progresses leads to rearrangement in the fine purification part from the third interruption on. This rearrangement manifests itself in a significant reduction in the quality of the pure water. The process according to the invention and the known process also exhibit considerable differences in the throughputs per filter run and the useful capacities achieved for the anion exchanger employed.

The throughputs per filter run are: 12,393 l in the process according to the invention and 10,588 l in the known process.

The useful capacities achieved are: 0.72 equivalent/l for the process according to the invention and 0.605 equivalent/l for the known process.

Since the anion exchanger used in both processes has been regenerated with the same amount of regenerating agent, it follows that the utilisation of the regenerating agent is significantly better in the process according to the invention. The following regenerating agent excesses are calculated: 122% of theory for the process according to the invention and 145% of theory for the known process.

After the charging, according to the invention, of the anion exchanger, the anion exchanger in the lower chamber 2 is first backwashed. The water required for this enters the lower chamber 2 and the anion exchanger via valve 16 and leaves via the pipeline 10 and valve 12. The anion exchanger in the upper chamber 3 is then backwashed. For this, anion exchanger is transferred from chamber 3 to chamber 2, until chamber 2 is full, by opening the pipeline via valve 11 and passing water through valve 17 the chamber 3 and by opening valve 16. Valve 11 is then closed and the anion exchanger in chamber 3 is backwashed, until no further fines can be detected, by passing in water through valve 16 and removing it via the opened valve 13.

EXAMPLE 3

The ion exchanger filter used has an internal diameter of 776 mm and a cylindrical jacket height of 4,500 mm. It is divided into three chambers of identical size, arranged one on top of the other, by two trays which are permeable to liquid (nozzle trays). Two adjacent chambers are in each case connected to one another by the pipelines bridging the nozzle trays. These pipelines have a nominal width of 65 mm (NW 65) and are mounted in each case 200 mm (measured from the middle of the pipe) below and above the nozzle trays to be bridged. The pipelines are provided with a shut-off valve and a valve for discharge of the washing water. A pipe (nominal width 65 mm) provided with a valve is mounted, for backwashing the ion exchanger, 100 mm below the nozzle tray which closes off the uppermost chamber at the top.

The filter is filled with a total of 1,500 l of a strongly acid cation exchanger (in the H⁺ form) in a manner such that the height of the resin bed in the top chamber is 1,395 mm, the height of the resin bed in the middle chamber is 888 mm and the height of that in the bottom chamber is 888 mm.

To compare the capacities of the countercurrent process according to the invention and of the known countercurrent process, the ion exchanger filter described above (a) is operated in the manner according to the invention, that is to say the valves in the pipelines, from the first chamber to the second chamber and from the second chamber to the third chamber, bridging the nozzle trays remain open throughout the entire charging operation. This means that the top chamber through which the liquid to be treated flows last is uniformly filled with ion exchanger as a result of the transfer of cation exchanger from the lower chambers to the top chamber. (b). Is operated in the known manner, that is to say the third chamber is filled with cation exchanger (in the H⁺ form) to the extent such that a free space of 7% of the volume of resin in this upper chamber still remains between the cation exchanger packing and the top nozzle tray. During charging, the valves in the pipelines bridging the nozzle trays are closed. In this manner, the amount of ion exchanger in the individual chambers is kept constant during the filter run.

Crude water with a total salt content of 11.3 m equivalents/l (Ca and Mg: 7.5 m equivalents/l; Na and K: 3.8 m equivalents/l) is used for charging. The water is passed through the filter at a rate of 18 m³/hour. The filter run is interrupted for a period of 15 minutes after every 2 hours. The filter run is ended when the conductivity in the runnings of the filter which is downstream of the cation exchanger and contains a strongly basic anion exchanger has risen to 10 $\mu$S.

Comparison of the results achieved in the process according to the invention and in the known filter process shows that the process according to the invention gives pure water of a very uniform quality, and that this quality is not affected by a total of 8 interruptions. In contrast, the known process gives pure water of constant quality only after the first two interruptions; after further interruptions, the quality of the pure water decreases noticeably. Further results are summarised in the Table below:

|  | according to the invention | according to the known process |
| --- | --- | --- |
| Water throughput per cycle (m³) | 177.9 | 148.7 |
| Useful capacity: |  |  |
| (a) in equivalents/cycle | 2,010.3 | 1,680.3 |
| (b) in equivalents/liter of cation exchanger | 1.34 | 1.12 |
| 0 Pure water quality ($\mu$S/cm in the filtrate of the strongly basic anion exchanger downstream) | 1.84 | 4.77 |

What is claimed is:

1. In the countercurrent process for the treatment of liquids with an ion exchanger the volume of which decreases on charging and increases on regeneration, by charging this ion exchanger in upward flow, the lower part of the ion exchanger mass being in the form of a fluidized bed and the upper part being in the form of a fixed bed, regenerating the charged ion exchanger in downward flow and backwashing in upward flow, the improvement comprising (a) distributing the ion exchanger within the ion exchange filter between 2 or 3 chambers which are separated from each other by trays which are permeable to liquid, and of which chambers adjacent chambers are connected to one another by a pipeline which permits the transfer of the ion exchanger and has a shut-off organ;

(b) conveying the ion exchanger into the individual chambers, or removing it from them, within the filter before and/or during the individual phases of operation, via the pipeline which permit transfer of the ion exchanger, in an amount such that during charging, the chamber through which the liquid to be treated flows last is filled to the extent of 80 to 98% by volume relative to the volume of the chamber, with ion exchanger in the form of a fixed bed, and that during regeneration, this chamber through which the liquid flowed last is uniformly filled to the extent of 80 to 100% by volume, relative to the chamber volume, with ion exchanger and that, during backwashing, the backwashing space in the chamber to be backwashed is 30 to 100% by volume, relative to the volume of the ion exchanger in the chamber to be backwashed; and (c) using for transfer of the ion exchanger from one chamber into the other the liquid to be treated during charging, the regeneration agent during regeneration and the backwashing liquid during backwashing.

2. The process of claim 1, wherein the backwashing space is 40 to 50% by volume, relative to the volume of ion exchanger in the chamber to be backwashed.

* * * * *